(12) United States Patent
Gorman et al.

(10) Patent No.: US 11,725,363 B2
(45) Date of Patent: *Aug. 15, 2023

(54) MACHINE CONFIGURATION AND CONTROL SYSTEM ENABLING INTERCHANGEABLE POWER SOURCES

(71) Applicant: CATERPILLAR SARL, Geneva (CH)

(72) Inventors: Corey Lee Gorman, Peoria, IL (US); Andy Fung, Hyogo Prefecture (JP); Kouji Kishida, Hyogo-ken (JP); Shuji Kidoguchi, Tokyo (JP); Takeshi Tsuneyoshi, Hyogo-ken (JP); Michihiro Izawa, Hyogo-ken (JP); Shinichi Nishiyama, Hyogo-ken (JP); Marilyn E. Worley, East Peoria, IL (US); Kazumasa Matsumura, Hyogo-ken (JP); Kentaro Nakayama, Hyogo-ken (JP)

(73) Assignee: Caterpillar SARL, Geneva (CH)

( * ) Notice: Subject to any disclaimer, the term of this patent is extended or adjusted under 35 U.S.C. 154(b) by 445 days.

This patent is subject to a terminal disclaimer.

(21) Appl. No.: 16/942,180

(22) Filed: Jul. 29, 2020

(65) Prior Publication Data
US 2022/0034064 A1 Feb. 3, 2022

(51) Int. Cl.
*E02F 9/08* (2006.01)
*B60K 6/00* (2006.01)
(Continued)

(52) U.S. Cl.
CPC .............. *E02F 9/0866* (2013.01); *B60K 6/00* (2013.01); *E02F 9/0808* (2013.01); *E02F 9/18* (2013.01);
(Continued)

(58) Field of Classification Search
CPC ......... E02F 9/0866; E02F 9/0808; E02F 9/18; E02F 9/22; E02F 9/207; E02F 9/2075;
(Continued)

(56) References Cited

U.S. PATENT DOCUMENTS

2002/0104239 A1 8/2002 Naruse
2007/0214782 A1* 9/2007 Komiyama ........... B60W 20/10
60/431

FOREIGN PATENT DOCUMENTS

CN 204753679 U 11/2015
JP 2001040705 A 2/2001
(Continued)

OTHER PUBLICATIONS

English translation of Ishii et al. (JP 2020056152) (Year: 2020).*
English translation of Sun et al. (CN-204753679) (Year: 2015).*

*Primary Examiner* — James M McPherson
*Assistant Examiner* — Kyle J Kingsland

(57) ABSTRACT

A machine is adapted for operation powered by any one of a plurality of interchangeable power sources. The machine may include an undercarriage configured for supporting ground engagement members that propel the machine and an upper structure rotatably supported on the undercarriage. The upper structure may include a swing frame, with the swing frame supporting an operator cab, any one of the plurality of interchangeable power sources, hydraulic components, electrical components, and a counterweight disposed at a first end of the swing frame. The counterweight may include a hollowed out portion facing toward the swing frame. The hollowed out portion of the counterweight may be centrally aligned with a center core portion of the swing frame configured for supporting any one of the plurality of interchangeable power sources, with the one power source being partially accommodated within the hollowed out portion of the counterweight.

16 Claims, 8 Drawing Sheets

(51) Int. Cl.
  *E02F 9/18* (2006.01)
  *E02F 9/22* (2006.01)
  *E02F 3/32* (2006.01)

(52) U.S. Cl.
  CPC ........... *E02F 9/22* (2013.01); *B60Y 2200/412* (2013.01); *E02F 3/32* (2013.01)

(58) Field of Classification Search
  CPC .... B60K 6/00; B60K 1/00; B60K 2001/0455; B60K 2001/0477
  See application file for complete search history.

(56) References Cited

FOREIGN PATENT DOCUMENTS

| | | | |
|---|---|---|---|
| JP | 2016079764 A | 5/2016 | |
| JP | 2020056152 A | 4/2020 | |

\* cited by examiner

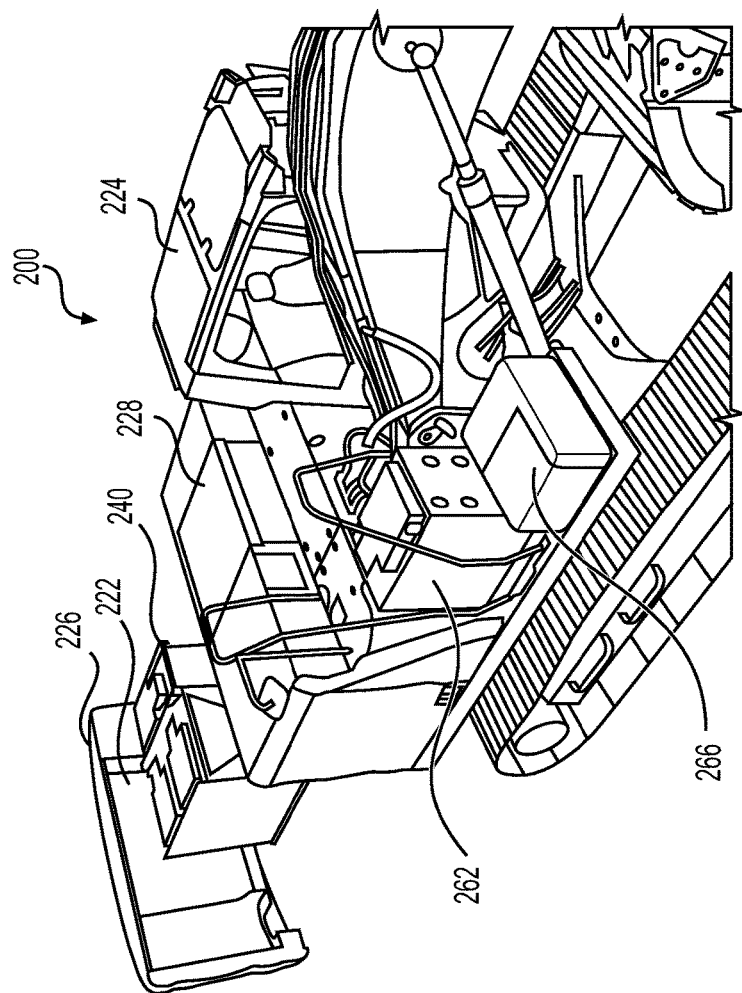
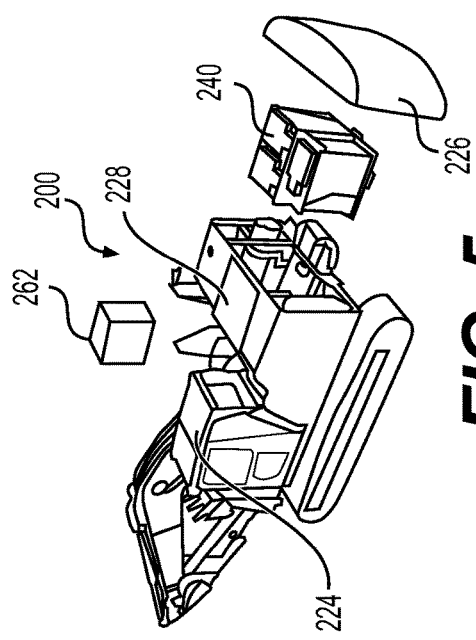
FIG. 4
FIG. 5

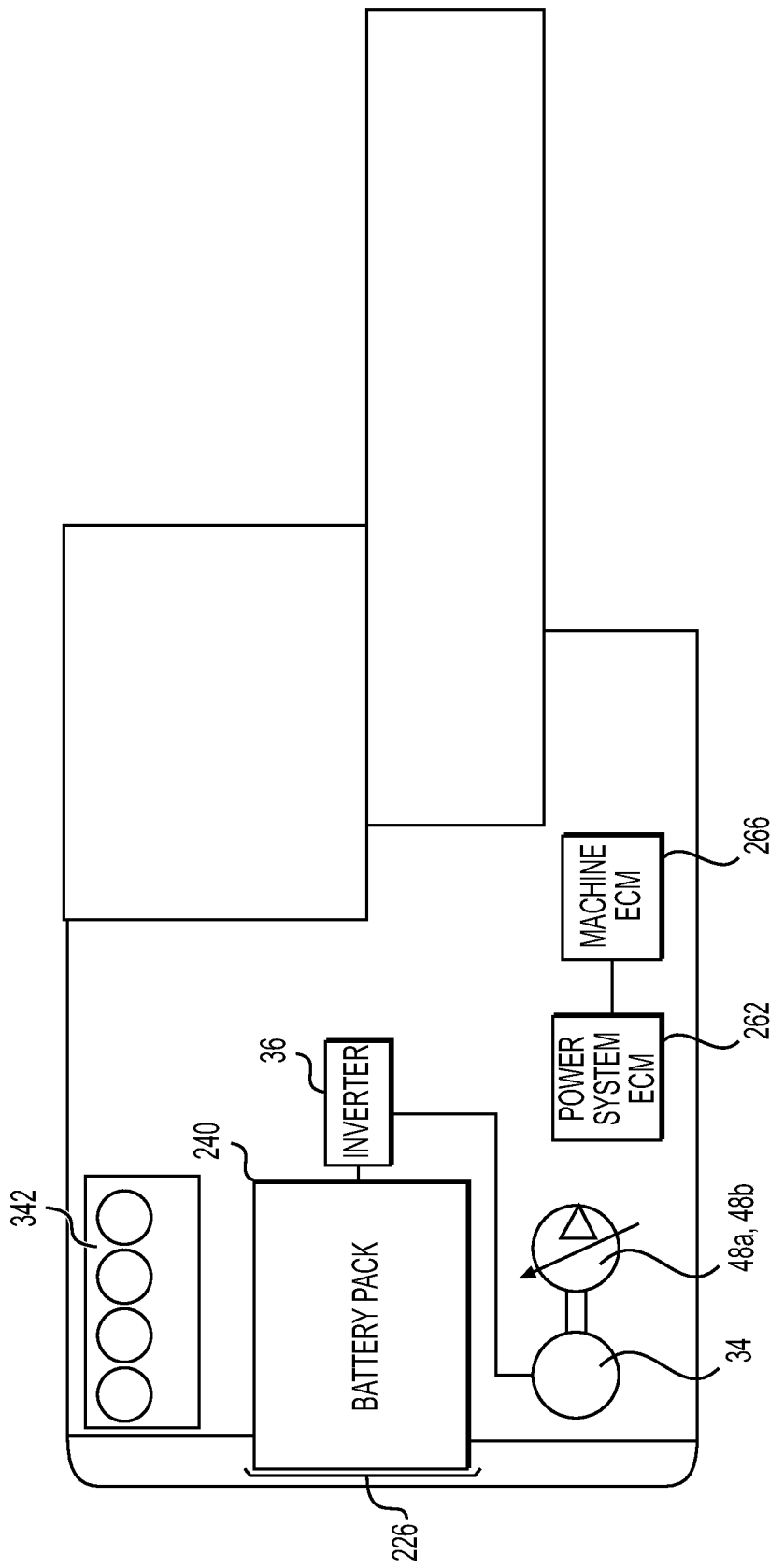

MACHINE CONFIGURATION AND CONTROL SYSTEM ENABLING INTERCHANGEABLE POWER SOURCES

TECHNICAL FIELD

The present disclosure relates to a machine having interchangeable power sources, and more particularly, to a machine configuration and control system enabling the interchangeable power sources.

BACKGROUND

Some conventional machines have a hydraulic power source for operating hydraulic actuators. For example, such a machine might typically include an internal combustion engine for driving one or more hydraulic pumps, which, in turn, supply power to one or more hydraulic actuators for performing work. One example of such a machine is a hydraulic excavator. A hydraulic excavator may typically include one or more hydraulic pumps, which provide hydraulic power in the form of pressurized fluid flow to one or more hydraulic motors and hydraulic cylinders for operation of a swing mechanism, boom, stick, and digging implement. In such a machine, the hydraulic motors may be used to rotate a cab relative to a chassis on which the cab is mounted and drive ground engagement devices such as wheels or tracks for movement of the machine. Hydraulic power provided to the hydraulic actuators may be used to raise and lower the boom and manipulate the stick and the digging implement in order to perform digging and/or loading operations.

To increase the efficiency and/or reduce undesirable emissions resulting from operation of the internal combustion engine, efforts have been made to recapture some of the energy typically lost during operation of such a machine. For example, energy may be recaptured in the form of stored electric and hydraulic energy for use by electric and hydraulic devices. Thus, it may be desirable to perform some working functions in a machine with both stored hydraulic energy and stored electric energy by use of both electric and hydraulic devices. A typical machine is designed and configured for only one power plant, such as an internal combustion engine. However, even with improvements in engine performance and/or efficiency, when employing internal combustion engines it is generally necessary to provide exhaust aftertreatment systems, as well as fuel control systems, air supply systems, and cooling systems to achieve desired engine performance and efficiency and to meet government-mandated emission standards. Therefore, it may be desirable to provide a machine configuration that enables and accommodates the installation of alternative, and potentially interchangeable power plants, such as fully battery-powered systems, fuel cell systems, and tethered cable systems that receive electrical power from external power sources, as alternatives to traditional internal combustion engines such as diesel engines. When all of the power requirements for operating the various systems and subsystems of a machine over a predetermined period of time can be met by the electrical power stored in a battery, the machine may be configured to eliminate any internal combustion engine entirely. A fully battery-powered machine, for example, may also benefit from the elimination of fuel storage, fuel supply, and fuel injection systems, ignition systems, exhaust aftertreatment systems, liquid-cooling systems with complex networks of coolant passageways, pumps, and radiators, and other components and systems associated with power produced by converting energy from combustion of fuel mixtures within cylinders of an engine into rotational output of a drive shaft. It may also be desirable to provide machine control systems and methods for automatically sensing the type of power source being used on the machine, processing detected outputs and characteristics specific to the particular power source, and enabling standardized power output to provide normalized, consistent control and operation of machine systems regardless of the type of power source being used in conjunction with a machine engine control module (ECM).

A hybrid construction machine is disclosed U.S. Pat. No. 7,669,413 B2 to Komiyama et al. ("the '413 patent"). In particular, the '413 patent discloses a hybrid excavator including a hydraulic pump, a generator motor connected in parallel to an output shaft of an engine, and a rotation motor driven by a battery. The generator motor assists the engine by performing a motor function. Power consumption of each of the hydraulic pump and the rotation motor is detected, and the output of the hydraulic pump and the rotation motor is controlled such that the sum of the detected power consumption does not exceed a maximum supply power set as the sum of power that can be supplied to the hydraulic pump and the rotation motor.

Although the machine disclosed in the '413 patent includes both electric and hydraulic devices, the machine disclosed in the '413 patent still requires an internal combustion engine with a hydraulic pump connected to an output shaft of the engine. As a result, the machine disclosed in the '413 patent still requires fuel storage, fuel supply, and fuel injection systems, ignition systems, exhaust aftertreatment systems, liquid-cooling systems with complex networks of coolant passageways, pumps, and radiators, and other components and systems associated with power produced by converting energy from explosions of fuel mixtures within cylinders of an engine into rotational output of a drive shaft.

SUMMARY

In one aspect, the present disclosure is directed to a machine adapted for operation powered by any one of a plurality of interchangeable power sources. The machine may include an undercarriage configured for supporting ground engagement members that propel the machine, and an upper structure rotatably supported on the undercarriage. The upper structure may include a swing frame, with the swing frame being configured for supporting an operator cab, any one of the plurality of interchangeable power sources, hydraulic components, and electrical components. A counterweight may be disposed at a first end of the swing frame, the counterweight including a hollowed out portion facing toward the swing frame, with the hollowed out portion being centrally aligned with a center core portion of the swing frame configured for supporting any one of the plurality of interchangeable power sources, with the one power source being partially accommodated within the hollowed out portion of the counterweight.

According to another aspect, the disclosure is directed to a machine adapted for operation powered by a battery. The machine may include an undercarriage configured for supporting ground engagement members that propel the machine, and an upper structure rotatably supported on the undercarriage. The upper structure may include a swing frame, the swing frame being configured for supporting an operator cab, the battery, hydraulic components, and electrical components. A counterweight may be disposed at a first end of the swing frame, the counterweight including a hollowed out portion facing toward the swing frame, with the hollowed out portion being centrally aligned with a center core portion of the swing frame configured for supporting the battery, and with the battery being partially accommodated within the hollowed out portion of the counterweight.

According to a further aspect, the disclosure is directed to a machine adapted for normal operations powered by one of a plurality of interchangeable, full size power sources, and select, temporary operations during one or more of manufacturing of the machine, loading of the machine, shipping of the machine, or delivery of the machine, wherein the select operations are powered by a temporary battery with a smaller power capacity than the one of the plurality of full size power sources. The machine may include an undercarriage configured for supporting ground engagement members that propel the machine, and an upper structure rotatably supported on the undercarriage, the upper structure comprising a swing frame. The swing frame may be configured for supporting an operator cab, the one of a plurality of full size power sources and the temporary battery, hydraulic components, and electrical components. A counterweight may be disposed at a first end of the swing frame, the counterweight including a hollowed out portion facing toward the swing frame, with the hollowed out portion being centrally aligned with a center core portion of the swing frame configured for supporting the temporary battery during the select, temporary operations and the one of a plurality of full size power sources during normal operations. The one of a plurality of full size power sources and the temporary battery may be partially accommodated within the hollowed out portion of the counterweight.

BRIEF DESCRIPTION OF THE DRAWINGS

FIGS. 4-6 are partially exploded perspective views of an exemplary embodiment of a machine that may include a configuration and a control system enabling interchangeable power sources.

FIG. 9 a schematic diagram of an exemplary swing frame layout for a machine that may include a configuration and a control system enabling interchangeable power sources.

DETAILED DESCRIPTION

Figure 1:
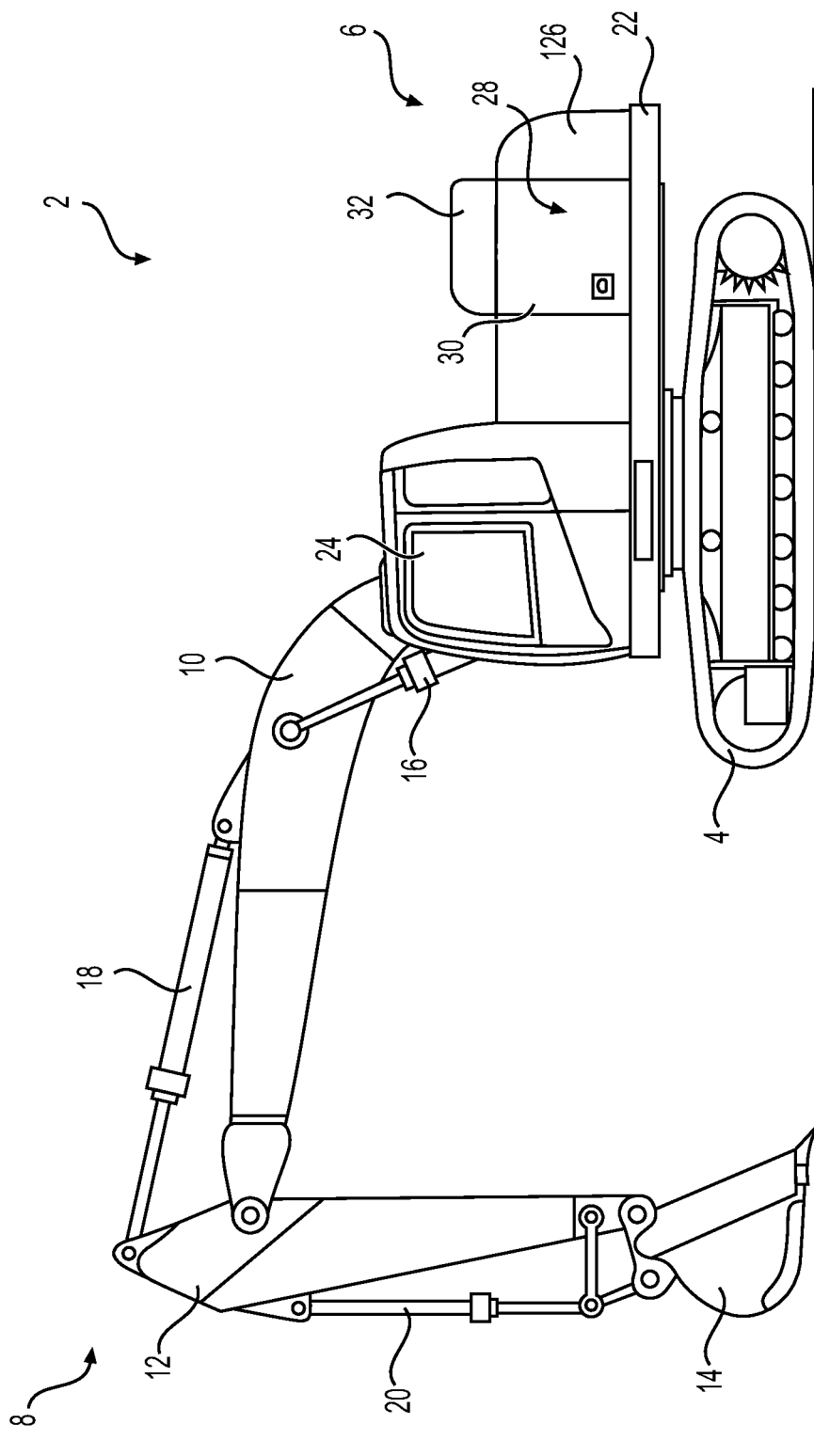
FIG. 1 is a schematic diagram of an exemplary embodiment of a machine that may include a configuration and a control system enabling interchangeable power sources.

FIG. 1 shows an exemplary embodiment of a machine 2 for performing work. In particular, the exemplary machine 2 shown in FIG. 1 is an excavator configured for performing operations such as digging and/or loading material. Although the exemplary systems and methods disclosed herein are described in relation to an excavator, the disclosed systems and methods may have applications in other machines such as automobiles, trucks, agricultural vehicles, work vehicles, wheel loaders, dozers, loaders, track-type tractors, graders, off-highway trucks, or any other machines known to those skilled in the art.

As shown in FIG. 1, exemplary machine 2 may include an undercarriage (or chassis) including ground engagement members 4 (e.g., tracks or wheels) for moving machine 2. Machine 2 may include an operator cab 24 mounted on an upper swinging body 6, which is rotatably attached to the undercarriage in a manner that permits rotation of cab 24 with respect to the undercarriage. A working arm apparatus 8 may be attached to upper swinging body 6 and configured to be moved in a vertical direction. The upper swinging body 6 may include a swing frame 22, which may be swung about a vertical axis with respect to the undercarriage, operator cab 24 disposed at a left front portion on swing frame 22, a counterweight 126 disposed at a rear portion on swing frame 22, a power source containing chamber 28 disposed on a front side of counterweight 126, a door 30 pivotally attached to swing frame 22 and configured to cover a side portion of chamber 28, and a hood 32 pivotally attached to swing frame 22 and configured to cover an upper side of chamber 28.

Working arm apparatus 8 may include a boom 10 coupled to cab 24 in a manner that permits boom 10 to pivot with respect to cab 24. At a distal end of boom 10, opposite from cab 24, a stick 12 may be coupled to boom 10 in a manner that permits stick 12 to pivot with respect to boom 10. An implement 14 (e.g., a digging implement or bucket) may be coupled to stick 12 in a manner that permits implement 14 to pivot with respect to stick 12. Although exemplary machine 2 shown in FIG. 1 includes a digging implement, other tools may be coupled to stick 12 when other types of work are desired to be performed.

In the exemplary embodiment shown, a pair of actuators 16 (only one shown) may be coupled to cab 24 and boom 10, such that extension and contraction of actuators 16 raises and lowers boom 10, respectively, relative to cab 24. Another actuator 18 may be coupled to boom 10 and stick 12, such that extension and retraction of actuator 18 results in stick 12 pivoting inward and outward, respectively, with respect to boom 10. Yet another actuator 20 may be coupled to stick 12 and digging implement 14, such that extension and retraction of actuator 20 results in digging implement 14 pivoting between closed and open positions, respectively, with respect to stick 12.

Figure 2:
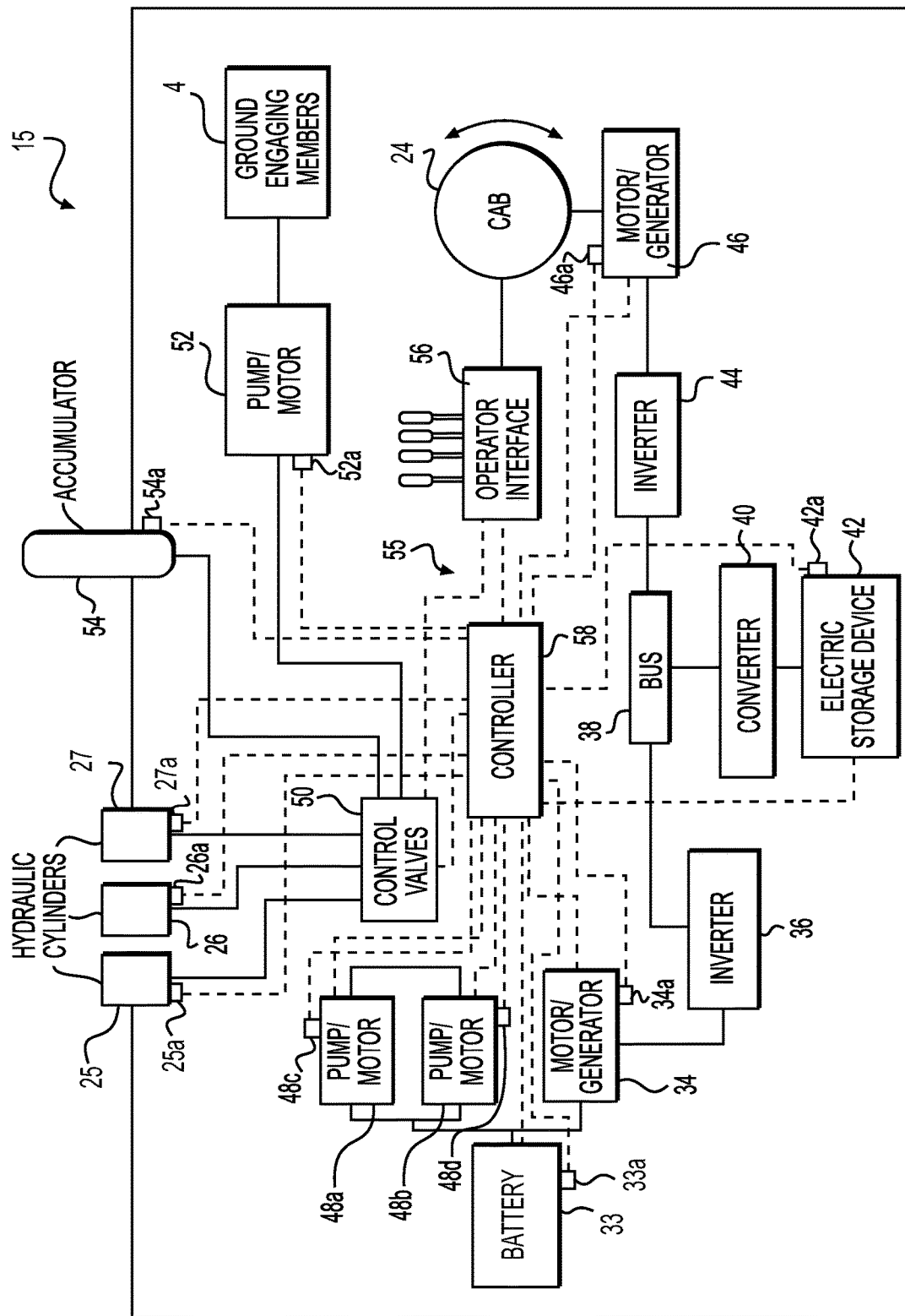
FIG. 2 is a schematic diagram of an exemplary embodiment of a power system of the machine of FIG. 1.

As explained in more detail with respect to FIG. 2, an exemplary machine may include a plurality of actuators 25, 26, and 27 configured for moving various components of the machine relative to each other. For example, actuator 25 may be equivalent to the actuator 16 of the excavator shown in FIG. 1 and configured to move boom 10 relative to cab 24. Actuator 26 may be equivalent to the actuator 18 shown in FIG. 1 and configured to move stick 12 relative to boom 10. Actuator 27 may be equivalent to the actuator 20 shown in FIG. 1 and configured to move digging implement 14 relative to stick 12. Each of actuators 25, 26, 27 may be hydraulic devices, in particular, hydraulic cylinders powered by supplying and draining fluid from the cylinders on either side of a piston to cause reciprocating movement of the piston within the cylinder. One or more of actuators 25, 26, and 27 may be non-hydraulic actuators without departing from the concepts disclosed herein. In addition, the number of each of the actuators coupled to boom 10, stick 12, and/or implement 14, respectively, may be changed without departing from the concepts disclosed herein.

Referring to FIG. 2, exemplary machine 2 may include a power system 15 including electric and hydraulic devices operated respectively via electric and hydraulic power sources and controlled by a controller. According to various exemplary embodiments of this disclosure, exemplary power system 15 may include any one of a plurality of interchangeable power sources such as an internal combustion engine, a battery, a fuel cell, or direct operation of the power system on machine 2 connected to an external source of power such as a power grid or an external generator through a slip ring and tethered cable. Exemplary internal combustion engines may include, for example, a compression-ignition engine, a spark-ignition engine, a gas turbine engine, a homogeneous-charge compression ignition engine, a two-stroke engine, a four-stroke, or any type of internal combustion engine known to those skilled in the art. An internal combustion engine may be configured to operate on any fuel or combination of fuels, such as, for example, diesel, bio-diesel, gasoline, ethanol, methanol, or any fuel known to those skilled in the art. Further, an internal combustion engine may be supplemented by a hydrogen-powered engine, fuel-cell, solar cell, and/or any power source known to those skilled in the art.

In the exemplary embodiment shown in FIG. 2, power system 15 may include an electric motor/generator 34. Motor/generator 34 may be electrically coupled to an inverter 36 (e.g., a DC-AC inverter), which, in turn, may be electrically coupled to a bus 38 (e.g., a DC bus). Exemplary power system 15 may further include a converter 40 electrically coupled to bus 38. Converter 40 may be a DC-DC converter, which, in turn, may be electrically coupled to an electric storage device 42. Electric storage device 42 may include one or more batteries and/or ultra-capacitors configured to store electric energy supplied from motor/generator 34 and/or any electrical energy generated by capturing energy associated with operation of machine 2, such as energy captured from regenerative braking of moving parts of the machine, such as, for example, ground-engagement members 4 and/or rotation of swing frame 22 and cab 24. Electric energy stored in electric storage device 42 may be used as a source of electric power as explained in more detail below.

Exemplary power system 15 may further include an inverter 44 (e.g., an DC-AC inverter) coupled to bus 38. Inverter 44 is electrically coupled to an electric motor/generator 46 (e.g., an AC motor/generator). In the exemplary embodiment shown, motor/generator 46 is coupled to cab 24 such that operation of motor/generator 46 results in cab 24 rotating relative to the undercarriage. In addition, motor/generator 46 may be capable of slowing and stopping rotation of cab 24 in a regenerative manner that results in electric energy being generated that may be routed via inverter 44, bus 38, and converter 40 to electric storage device 42 for later supply to electric actuators such as motor/generators 34 and 46. According to some embodiments, electric energy in electric storage device 42 may be routed via converter 40, bus 38, and inverter 36 to motor/generator 34, which may then use the electric energy to drive one or more of hydraulic pump/motors 48a and 48b, thus enabling electric power sources to drive hydraulic devices in the machine. In alternative embodiments in which the main power source for a machine with power system 15 is a different interchangeable power source such as an internal combustion engine, or a fuel cell, the electric energy from electric storage device 42 or from one or more of motor/generator 46 and motor/generator 34 may supplement the internal combustion engine or fuel cell, and/or drive one or more hydraulic pump/motors 48a and 48b. According to some embodiments, electric energy generated by motor/generator 34 and/or motor/generator 46 may be routed between the two motor/generators 34 and 46 without necessarily being stored in electric storage device 42, for example, by being routed from motor/generator 46, via inverter 44, bus 38, and inverter 36 to motor/generator 34, or from motor/generator 34, via inverter 36, bus 38, and inverter 44 to motor/generator 46.

In the exemplary embodiment shown in FIG. 2, motor/generator 34 is coupled to two hydraulic pump/motors 48a and 48b, which may include fixed-displacement or variable-displacement pumps. Although the exemplary embodiment shown includes two pump/motors 48a and 48b, a single pump/motor or more than two pump/motors may be used. In the exemplary configuration shown, motor/generator 34 supplies electrical power to drive pump/motors 48a and 48b, which, in turn, provide hydraulic power to power system 15 by causing pressurized fluid to flow to and from hydraulic cylinders 25, 26, and 27. In addition, according to some embodiments, one or more of pump/motors 48a and 48b may drive motor/generator 34, which may, in turn, supply electric power to electric devices of machine 2.

In the exemplary embodiment shown in FIG. 2, pump/motors 48a and 48b are hydraulically coupled to control valves 50, such that pump/motors 48a and 48b supply pressurized fluid to control valves 50, which, in turn, control fluid flow to and from hydraulic devices of machine 2. For example, as shown in FIG. 2, control valves 50 are hydraulically coupled to hydraulic cylinders 25, 26, and 27, and hydraulic pump/motor 52, which, when supplied with pressurized fluid flow, drive ground-engagement members 4. Although a single hydraulic motor 52 is shown, power system 15 may include one or more hydraulic motors 52, for example, one for each of ground-engagement members 4. Further, hydraulic pump/motor(s) 52 may be capable of slowing and stopping ground-engagement members 4 in a regenerative manner that results in hydraulic energy being generated that may be rerouted to provide hydraulic power to power system 15, stored in a hydraulic storage device for later supply of hydraulic power to hydraulic actuators, and/or to provide hydraulic power to pump/motors 48a and 48b, which may supplement electric storage device 42, as explained in more detail below.

Exemplary power system 15 may also include an accumulator 54 hydraulically coupled to control valves 50. Accumulator 54 may be configured to store hydraulic energy captured during operation of power system 15. For example, as explained above, hydraulic motor(s) 52 may be configured to slow movement of ground-engagement members 4 by operating as pumps such that ground-engagement members 4 drive the pumps, thereby slowing ground-engagement members 4. The energy supplied to the hydraulic fluid by virtue of the pumping may be routed via control valves 50 for storage in accumulator 54 for later use, and/or to pump/motors 48a and 48b.

In the exemplary power system 15, hydraulic cylinders 25, 26, and 27 may each be hydraulically coupled to control valves 50. As explained with respect to FIG. 1, hydraulic cylinders 25, 26, and 27 may be equivalent to cylinders 16, 18, and 20, respectively, coupled to boom 10, stick 12, and implement 14 for manipulating boom 10, stick, 12, and implement 14. Similar to hydraulic motor(s) 52, hydraulic cylinders 25, 26, and 27 may be operated in a regenerative manner that results in hydraulic energy being generated, which may be rerouted to provide hydraulic power to power system 15 and/or stored in accumulator 54. For example, if a boom such as boom 10 in FIG. 1 is lowered from an elevated position, pressurized fluid is forced in a controlled manner from hydraulic cylinder 16. Similarly, movement of a component on a machine with power system 15 of FIG. 2 may result in pressurized fluid being forced in a controlled manner from cylinder 25 in FIG. 2. This pressurized fluid may be routed via control valves 50 for storage in accumulator 54, and/or to one or more of pump/motors 48a, 48b, and 52 for assisting operation of those hydraulic devices.

Exemplary power system 15 shown in FIG. 2 may include a control system 55 for controlling power system 15. For example, power system 15 may include an operator interface 56 that may be contained in cab 24. According to some embodiments, operator interface 56 may be located remote from machine 2 for remote control of machine 2. Exemplary operator interface 56 may include a number of controls (e.g., levers, pedals, and/or buttons) for control of machine 2 and its functions. In the exemplary embodiment shown, operator interface 56 may be coupled to control valves 50, electrically and/or hydraulically, so that electric control signals and/or hydraulic control signals (e.g., via a hydraulic pilot circuit) may be sent from operator interface 56 to control valves 50. Such electric and hydraulic control signals may be used to control operation of control valves 50 for operation and control of the hydraulic devices of power system 15. In addition, operator interface 56 may be coupled electrically to a controller 58 configured to control operation of one or more electric and hydraulic devices of exemplary power system 15, as explained in more detail below.

In addition, controller 58 may be coupled to a number of sensors associated with the devices of machine 2 in order to receive signals indicative of the operation of the devices. For example, machine 2 may include the following sensors: a motor/generator sensor 34a associated with motor/generator 34, a storage device sensor 42a associated with electric storage device 42, a motor/generator sensor 46a associated with motor/generator 46, pump/motor sensors 48c and 48d associated respectively with pump/motors 48a and 48b, hydraulic sensors 25a, 26a, and 27a associated respectively with hydraulic cylinders 25, 26, and 27 (respectively equivalent to hydraulic cylinders 16, 18, and 20 of the exemplary excavator 2 in FIG. 1), accumulator sensor 54a associated with accumulator 54, and pump/motor sensor 52a associated with pump/motor 52. Each of the sensors identified above may include a single sensor or a number of sensors operating together to provide signals indicative of the operation of the associated device.

Electric storage device sensor 42a may include a charge sensor, a current sensor, a voltage sensor, and/or other electric storage device-related sensors. Motor/generator sensors 34a and 46a may include a speed sensor, a current sensor, a voltage sensor, and/or other motor/generator-related sensors. Pump/motor sensors 48c, 48d, and 52a may include a speed sensor, a flow rate sensor, a pressure sensor, and/or other hydraulic-related sensors. Accumulator sensor 54a may include a pressure sensor and/or other hydraulic-related sensors.

Controller 58 may include one or more processors, microprocessors, central processing units, on-board computers, electronic control modules, and/or any other computing and control devices known to those skilled in the art. Controller 58 may be configured to run one or more software programs or applications stored in a memory location, read from a computer-readable medium, and/or accessed from an external device operatively coupled to controller 58 by any suitable communications network.

Exemplary controller 58 may be configured to control operation of exemplary power system 15, including battery 33 and various electric and hydraulic devices of exemplary machine 2. For example, controller 58 may be configured to communicate with each of the electric and hydraulic devices as both potential suppliers and consumers of electric and hydraulic power, and upon receipt of operator requests, control operation of the main power source of machine 2 and electric and hydraulic devices in a coordinated manner to provide desired machine performance and efficiency.

For example, electric motor/generators 34 and 46 may operate by either consuming electric power or supplying electric power. They may consume electric power when operated to accelerate a device driven by motor/generators 34 and 46. For example, motor/generator 34 may be driven to assist battery 33 or another different, interchangeable power source for machine 2 with supplying power to hydraulic pump/motors 48a and 48b, and motor/generator 46 may be driven to rotate cab 24. Motor/generator 34 may also supply electric power to power system 15 when operated to decelerate vehicle 2, using the generator portion of motor/generator 34 to generate electric power. Motor/generator 46 may also operate to supply electric power to power system 15 in a similar manner when decelerating rotation of cab 24. In addition, motor/generators 34 and 46 may supply electric power to each other and to energy storage device 42 when operating in a generator mode.

Energy storage device 42 may also operate as either a supplier or consumer of electric power. For example, energy storage device 42 may operate as a supplier of electric power by providing electric power to motor/generator 34 to assist output of battery 33 and/or to motor/generator 46 to rotate cab 24. Electric storage device 42 may also act as a consumer of electric power when it stores electric power received from motor/generators 34 and 46.

The hydraulic devices may also be viewed as both consumers and suppliers of hydraulic power. For example, pump/motors 48a, 48b, and 52 may operate by either consuming hydraulic power or supplying hydraulic power. They may consume hydraulic power when operated to increase the flow rate and/or pressure in the hydraulic system, for example, to operate hydraulic cylinders 25, 26, and 27 against a load. In addition, pump/motors 48a, 48b, and 52 may operate to consume hydraulic power to drive another of the pump/motors and/or to provide pressurized fluid to accumulator 54. For example, one or more of pump/motors 48a and 48b may operate as a pump to provide fluid to drive pump/motor 52 to drive ground engagement members 4 for moving machine 2.

Pump/motors 48a, 48b, and/or 52 may also supply hydraulic power to power system 15. For example, as motion of the machine 2 is slowed via pump/motor 52, pump/motor 52 may convert the kinetic energy of machine 2 by pumping hydraulic fluid, thereby supplying hydraulic power to power system 15, which may be used by pump/motors 48a and 48b to assist battery 33 with supplying power to electric motor/generator 34, to assist with operation of hydraulic cylinders 25, 26, and 27 against a load, and/or to supply pressurized fluid to accumulator 54 for storage.

Similarly, hydraulic cylinders 25, 26, and 27 may operate to either consume or supply hydraulic power. For example, with reference to the exemplary excavator of FIG. 1, as boom 10 is lowered, hydraulic cylinder 16 (which may be equivalent to cylinder 25 in FIG. 2) may operate to supply hydraulic power in the form of pressurized fluid to the hydraulic system, which may be used to supply power to pump/motors 48*a*, 48*b*, and 52, other hydraulic cylinders 26 and 27, and/or accumulator 54. Hydraulic cylinder 25 may also operate as a power consumer when acting against a load (e.g., when equivalent cylinder 16 of the exemplary excavator 2 of FIG. 1 is raising boom 10) by drawing hydraulic power from one or more of pump/motors 48*a*, 48*b*, and 52, accumulator 54, and/or other hydraulic cylinders 26 and 27.

Accumulator 54 may also operate as either a supplier or consumer of hydraulic power. For example, accumulator 54 may operate as a supplier of hydraulic power by providing pressurized fluid to pump/motors 48*a* and 48*b* to assist output of battery 33, to hydraulic cylinders 25, 26, and 27 to act against a load, and/or to pump/motor 52 to drive ground engagement members 4. Accumulator 54 may operate as a consumer of hydraulic power when it stores hydraulic power in the form of pressurized fluid received from pump/motors 48*a*, 48*b*, and 52, and/or hydraulic cylinders 25, 26, and 27.

Exemplary controller 58 is configured to receive request signals indicative of requested operation of the electric and hydraulic devices, for example, signals received from operator interface 56, and control electric and hydraulic power in machine 2 according to a control strategy. For example, controller 58 may be configured to receive the request signals from interface 56 and operation signals from the electric and hydraulic devices upon receipt of the request signals. The operation signals are indicative of the status of the respective electric and hydraulic devices at the time of receipt of the request signals. For example, the operation signals may be signals received from the sensors associated with the respective electric and hydraulic devices and may include information about the power being supplied or consumed by the electric and hydraulic devices upon receipt of the request signals. The operation signals may also be indicative of the ability of the electric and hydraulic devices to either provide power or consume power upon receipt of the request signals by controller 58. According to some embodiments, operation signals may also include signals associated with operation of battery 33, or any of several alternative and interchangeable power sources, such as an internal combustion engine, a fuel cell, or a tethered cable power source. Controller 58 may determine the level of power to be supplied or consumed by any one of the interchangeable power sources and the electric and hydraulic devices based on the request signals, the operation signals, and the control strategy, and provide control signals for controlling operation of any one of the interchangeable power sources and the electric and hydraulic devices of machine 2.

Figure 3:
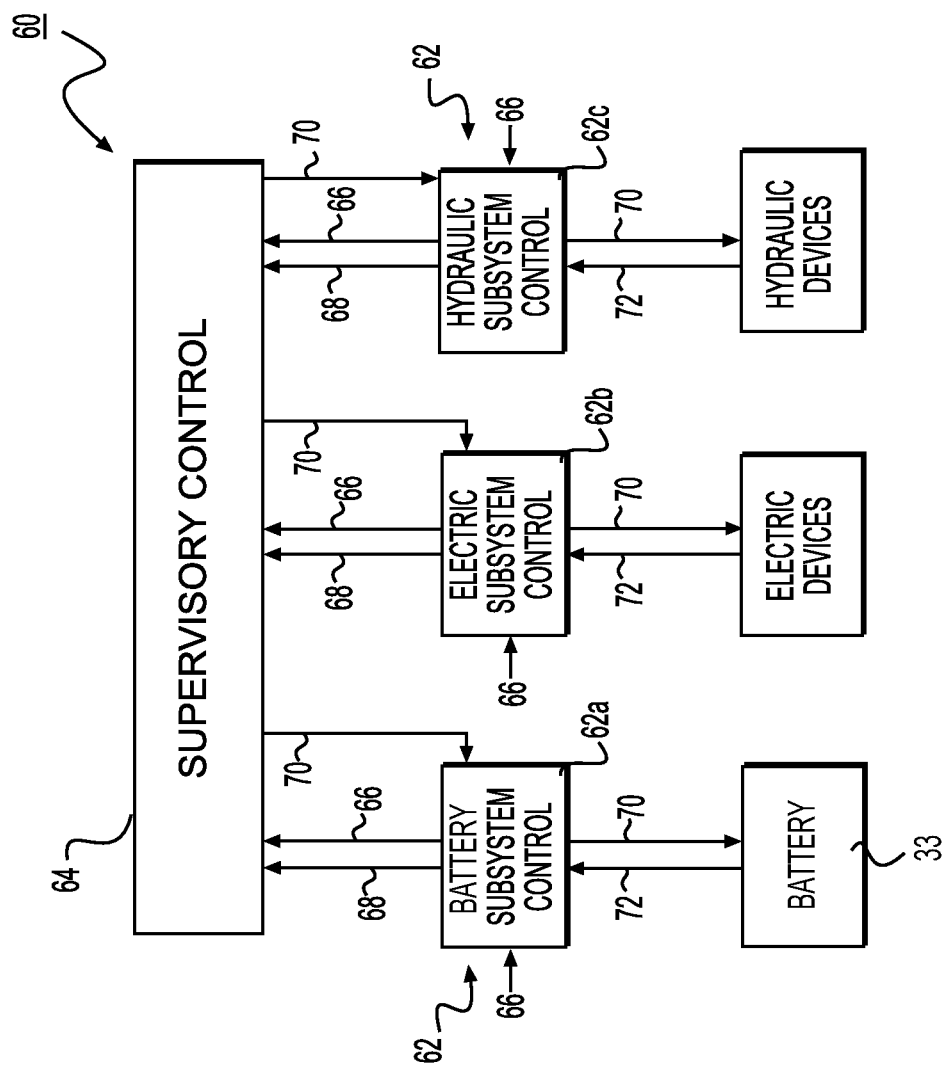
FIG. 3 is a schematic diagram of an exemplary control strategy for operation of an engine and electric and hydraulic devices in an exemplary machine.

FIG. 3 is a schematic diagram of an exemplary control strategy 60 for operation of any one of a plurality of interchangeable power sources on machine 2, such as battery 33 in FIG. 2, and associated electric and hydraulic devices of exemplary machine 2. As shown in FIG. 3, exemplary control strategy 60 may include subsystem controls 62 and a supervisory control 64. Exemplary subsystem controls 62 may include a battery subsystem control 62*a* for controlling operation of battery 33, an electric subsystem control 62*b* for controlling operation of the electric devices of the electric subsystem, and a hydraulic subsystem control 62*c* for controlling operation of the hydraulic devices of the hydraulic subsystem. Some embodiments may include additional subsystem controls for controlling operation of other devices.

Subsystem controls 62 are configured to provide supervisory control 64 with the request signals 66 indicative of the requested operation of the electric and hydraulic devices. According to some embodiments, supervisory control 64 may receive request signals 66 directly from a source other than subsystem controls 62, such as, for example, operator interface 56 and/or battery 33 and the electric and hydraulic devices themselves.

Subsystem controls 62 are also configured to provide request and range signals for operation of the energy storage devices associated with the respective electric subsystem and the hydraulic subsystem based on the interrelationship of operation of the devices within the respective subsystem. For example, within the electric subsystem, electric subsystem control 62*b* provides request signals for controlling operation of electric storage device 42 based on the operation of the other devices within the electric subsystem. Similarly, within the hydraulic subsystem, hydraulic subsystem control 62*c* provides request signals for controlling operation of accumulator 54 based on the operation of the other devices within the hydraulic subsystem.

Subsystem controls 62 are also configured to provide range signals 68 indicative of a range of acceptable electric and hydraulic power levels associated with operation of the electric and hydraulic devices upon receipt of request signals 66. Range signals 68 may also be based on how the device functions within a respective subsystem. For example, for the electric subsystem, range signals 68 for the respective electric devices may be based on the interrelationship of the operation of the electric devices within the electric subsystem, for example, as explained in more detail below with respect to electric storage device 42. Similarly, for the hydraulic subsystem, range signals 68 for the respective hydraulic devices may be based on the interrelationship of the operation of the hydraulic devices within the hydraulic subsystem, for example, as explained in more detail below with respect to accumulator 54.

Supervisory control 64 is configured to determine control signals 70 for controlling operation of battery 33 and the electric and hydraulic devices based on operation signals 72 (described previously herein), range signals 68, and request signals 66 indicative of requested operation of the electric and hydraulic devices. In this exemplary manner, controller 58 evaluates operation of battery 33, such as a current state-of-charge (SOC) for battery 33, battery temperature, power output, current output, voltage output, etc., and operation of the electric and hydraulic devices, compares the requested operation of the devices with the actual, real-time operation, and controls operation of battery 33 and the powered devices in a coordinated manner to provide the desired machine performance and improve efficiency.

Controller 58 may include software and application programming interfaces (API) defining interactions between multiple software intermediaries adapted and configured to receive and process variables, control parameters, and standards associated with each of a plurality of interchangeable power sources, such as an internal combustion engine, a battery, a fuel cell, and a tethered cable power system. Controller 58 may also be configured to interface with a main machine electronic control module (ECM), and an electric/hydraulic system ECM. Controller 58 may be configured to utilize control logic, various inputs, outputs, sensed and processed signals, stored, sensed, and/or processed data, parameters, variables, etc. (such as may be obtained at least in part from lookup tables and/or maps) to sense and process outputs and operating characteristics specific to the particular power source actually being used on the machine. Additionally, controller 58 may be configured to standardize the power output from the particular, interchangeable power source mounted and employed on the machine to provide a normalized, consistent control and operation of the various electric and hydraulic machine systems powered by the power source, regardless of the type of power source being used on the machine.

According to some embodiments, the range of acceptable electric power and hydraulic power levels is indicative of maximum and minimum power levels at which the electric and hydraulic devices are permitted to operate upon receipt of request signals 66 by controller 58. For example, the maximum and minimum power levels may be based on the capacity of the respective device to supply power or consume power, or to supply or consume power based on predetermined design limits. For example, pump/motor 48a may have a maximum pumping power output, and thus, the maximum power output level may be limited to the maximum pumping power output. As viewed from the perspective of battery 33, this would represent a maximum power consumption limit. However, as viewed from the perspective of hydraulic cylinders 25, 26, and 27, accumulator 54, and pump/motor 52, this would represent a maximum power supply limit. Alternatively, the maximum pumping power output of pump/motor 48a might be limited based on a predetermined design limit, for example, to avoid excessive wear on pump/motor 48a and/or other parts of machine 2.

The minimum power levels of range signals 68 may relate to a predetermined lower limit of acceptable power output. For example, for pump/motors 48a and 48b, the lower limit may be associated, for example, with the minimum power output to provide hydraulic cylinders 25, 26, and 27 with sufficient hydraulic power to hold a load in implement 14 at a current height.

Battery 33, or a different, interchangeable power source such as an internal combustion engine, a fuel cell, or a tethered cable system, may also provide, via its associated sensors 33a, operation signals 72 associated with operation of the particular power source being employed on machine 2. For example, a battery sensor 33a may provide signals indicative of the status of battery 33 (e.g., the SOC, power output, voltage output, or current output). Battery subsystem control 62a may provide range signals 68 indicative of maximum and minimum power levels at which battery 33 is permitted to operate upon receipt of request signals 66 by controller 58.

According to some embodiments, the ranges of acceptable electric, hydraulic, and power source power output levels may provide limits for supervisory control 64, so that supervisory control 64 does not provide control signals 70 for the electric devices, hydraulic devices, and a power source such as battery 33 that fall outside the respective limits. As a result, although supervisory control 64 may determine a most efficient solution (i.e., based on power consumption considerations alone) for operating the power output levels of the interchangeable power source mounted on the machine and the electric and hydraulic devices that are powered by the power source, the ranges may prevent unintended and undesirable consequences of the most efficient solution.

For example, upon receipt of a request for deceleration of the rotation of cab 24 by controller 58, motor/generator 46 may operate as a generator, thereby supplying electric power to machine 2. If motor/generator 46 increases the level of deceleration of cab 24, it would supply a larger amount of electric power. However, this might result in the rotation of cab 24 stopping more quickly than the request calls for, thereby resulting in undesirable control characteristics. If motor/generator 46 decreases the level of deceleration of cab 24, it would supply a smaller amount of electric power. However, this might result in the rotation of cab 24 stopping more slowly than the request calls for, thereby also resulting in undesirable control characteristics. Supervisory control 64 may be configured to determine a most efficient solution for operating power output levels of the interchangeable power source mounted on the machine, wherein the solutions depend on which of the plurality of interchangeable power sources is actually mounted and employed on the machine.

When controller 58 receives a request signal 66 for decelerating cab 24, electric subsystem control 62b may determine a range of acceptable power supply levels for motor/generator 46 during deceleration. As noted above, because it might not be desirable for operation of machine 2 to reduce or increase the level of deceleration of cab 24, electric subsystem control 62b may determine a narrow range of acceptable power supply levels under these circumstances. Thus, electric subsystem control 62b would provide to supervisory control 64 request signal 66 indicative of the requested operation of motor/generator 46 and range signal 68 indicative of a narrow range of acceptable power supply levels for motor/generator 46. Supervisory control 64 would thereafter control operation of motor/generator 46 by determining a level of power supply to be provided by motor/generator 46 based on request signals 66, operation signals 72 of battery 33 and the various devices of machine 2, and range signal 68 received from electric subsystem control 62b. Thereafter, control signals 70 are provided to motor/generator 46 to control its operation. Control signals 70 may be sent from supervisory control 64 to electric subsystem control 62b, which may thereafter control operation of motor/generator 46. According to some embodiments, control signals 70 may be sent directly to motor/generator 46 without necessarily being relayed through electric subsystem control 62b.

As another example, during acceleration of cab 24, controller 58 may receive a request signal 66 for acceleration, and motor/generator 46 may operate as a motor, thereby consuming electric power from battery 33 or another interchangeable power source mounted on and employed by machine 2. If motor/generator 46 increases the level of acceleration of cab 24, it would consume a larger amount of electric power. If motor/generator 46 decreases the level of acceleration of cab 24, it would consume a smaller amount of electric power.

Electric subsystem control 62b may determine a range of acceptable power consumption levels for motor/generator 46 during acceleration of cab 24. For example, it might not be desirable for operation of machine 2 to increase the acceleration of cab 24 beyond the requested level. However, due to power limits for battery 33 on machine 2 or other considerations, it may be desirable to reduce the level of acceleration below the requested level. Thus, electric subsystem control 62b may provide a range of acceptable power consumption levels from a maximum equal to the requested level to a minimum well below the requested level. Electric subsystem control 62b may provide to supervisory control 64 a request signal 66 indicative of the requested operation of motor/generator 46 and a range signal 68 indicative of the range of acceptable power supply levels. Thereafter, supervisory control 64, using control signals 72, may control operation of motor/generator 46, for example, in the manner previously described, by determining a level of power for consumption by motor/generator 46 based on request signal 66 and range signal 68 received from electric subsystem control 62a, and operation signals 72 of battery 33 and the various devices of machine 21

Electric subsystem control 62b may determine a range for operation of electric storage device 42 based on the interrelationship of the operation of the electric devices within the electric subsystem. For example, if no electric devices are operating within electric subsystem, electric subsystem control 62b may provide supervisory control 64 with a request signal indicating no requests for electric devices and a range signal 68 for each of the electric devices, which indicates the ability of the electric devices, including electric storage device 42, to supply power to battery 33 and/or hydraulic subsystem via supplement of power to battery 33 for operation of one or more of pump/motors 48a and 48b.

However, if, for example, a request signal 66 is received for rotation of cab 24 (via motor/generator 46), electric subsystem control 62b may supply supervisory control 64 with request signals 66 for each of the electric devices, including electric storage device 42. In addition, electric subsystem control 62b may provide range signals 68 for each of the electric devices. For example, request signal 66 for operation of motor/generator 46 for rotation of cab 24 may request 50 units of electric power. Electric subsystem control 62b may determine that motor/generator 34 being driven by battery 33 has the ability to provide 40 units of electric power to motor/generator 46 to rotate cab 24, and electric storage device 42 has the ability to provide 40 units of electric power to motor/generator 46 to rotate cab 24. Thus, motor/generator 34 and electric storage device 42 may have a total of 30 units of excess capacity to meet the requested rotation of cab 24. Electric subsystem control 62b may determine respective range signals 66 for motor/generator 34 and electric storage device 42 indicating a range of power outputs of 0-40 units of power for each of motor/generator 34 and electric storage device 42, and a request signal 66 of 50 units for motor/generator 46 for rotation of cab 24. Electric subsystem control 62b may also determine a range signal for motor/generator 46 as outlined previously herein. Also, electric subsystem control 62b may determine request signals 66 for each of motor/generator 34 and electric storage device 42 to provide the 50 units of power to motor/generator 46. For example, electric subsystem control 62b may determine that the request signal 66 for motor/generator 34 will be 40 units of power, and the request signal for electric storage device 42 will be 10 units of power, thereby corresponding to the 50 units of electric power requested for operation of motor/generator 46 to rotate cab 24. The request signals 66 and range signals 68 may be supplied to supervisory control 64.

In this example, supervisory control 64 uses the request and range signals 66 and 68 from electric subsystem control 62b, as well as similar signals from engine subsystem control 62a and hydraulic subsystem control 62c, to determine control signals 70 for controlling operation of battery 33 and the electric and hydraulic devices of machine 2. For example, if electric power is not needed for supplementing battery 33 or the hydraulic system, supervisory control 64 may provide control signals 70 to electric subsystem control 62b, such that motor/generator 34 supplies, for example, 40 units of power to motor/generator 46, and electric storage device 42 supplies 10 units of power to motor/generator 46, thereby meeting the requested 50 units to rotate cab 24.

However, if supervisory control 64 determines that the hydraulic subsystem would benefit from power supplied by the electric subsystem, for example, if the hydraulic subsystem is unable to supply enough hydraulic power to meet the requested operation demands of the hydraulic subsystem, for example, because of limited capacity of battery 33 and/or an inability of accumulator 54 to offset the limited capacity of battery 33, supervisory control 64 may determine that the electric subsystem may supply power to supplement operation of battery 33 by, for example, 20 units of power, thereby increasing the capability of the hydraulic subsystem. Because the output of pump/motors 48a and 48b may be limited due to instantaneous battery output capability, supplementing operation of battery 33 with the electric subsystem may enable an increase in the hydraulic power pump/motors 48a and 48b may supply. Thus, in order to meet the 20-unit power demand for supplementing battery 33 and the 50-unit power demand of the request to rotate cab 24, 70 units of power may be supplied from the combined 80 units of available power from motor/generator 34 and electric storage device 42, so that 50 units are supplied to rotate cab 24, and 20 units are supplied to hydraulic subsystem via power supplied to battery 33.

In a similar manner, hydraulic subsystem control 62c may determine a range for operation of accumulator 54 based on the interrelationship of the operation of the hydraulic devices within the hydraulic subsystem. For example, if no hydraulic devices are operating within hydraulic subsystem, hydraulic subsystem control 62c may provide supervisory control 64 with a request signal indicating no requests for hydraulic devices and a range signal 68 for each of the hydraulic devices, which indicates the ability of the hydraulic devices, including accumulator 54, to supply power to battery 33 and/or electric subsystem via supplement of power to battery 33 for operation of motor/generator 34 of the electric subsystem.

However, if, for example, a request signal 66 is received for movement of machine 2 (via pump/motor 52 and ground engagement members 4), hydraulic subsystem control 62c may supply supervisory control 64 with request signals 66 for each of the hydraulic devices, including accumulator 54. In addition, hydraulic subsystem control 62c may provide range signals 68 for each of the hydraulic devices. For example, request signal 66 for operation of pump/motor 52 for movement of machine 2 may request 60 units of electric power. Hydraulic subsystem control 62c may determine that pump/motors 48a and 48b being driven by battery 33 have the ability to provide 50 units of hydraulic power to motor/generator 46 to move machine 2, and accumulator 54 has the ability to provide 30 units of hydraulic power pump/motor 52 to move machine 2. (According to some embodiments, hydraulic cylinders 25, 26, and/or 27 may be used to supply hydraulic power to pump/motor 52, as described previously herein.) Thus, pump/motors 48a and 48b and accumulator 54 may have a total of 20 units of excess capacity to meet the requested movement of machine 2. Hydraulic subsystem control 62c may determine respective range signals 66 for pump/motors 48a and 48b and accumulator 54 indicating a range of power outputs of 0-50 units for pump/motors 48a and 48b and 0-30 units of power for accumulator 54, and a request signal 66 of 60 units for pump/motor 52 for movement of machine 2. Hydraulic subsystem control 62c may also determine a range signal for pump/motor 52 as outlined previously herein. Also, hydraulic subsystem control 62c may determine request signals 66 for each of pump/motors 48a and 48b and accumulator 54 to provide the 60 units of power to pump/motor 52. For example, hydraulic subsystem control 62c may determine that the request signal 66 for pump/motors 48a and 48b will be 50 total units of power, and the request signal 66 for accumulator 54 (and/or hydraulic actuators 24, 26, and/or 27) will be 10 units of power, thereby corresponding to the 60 units of hydraulic power requested for operation of pump/motor 52 to move machine 2. The request signals 66 and range signals 68 are supplied to supervisory control 64.

In this example, supervisory control 64 may use the request and range signals 66 and 68 from hydraulic subsystem control 62c, as well as similar signals from engine subsystem control 62a and electric subsystem control 62b, to determine control signals for controlling operation of battery 33 or another interchangeable power source mounted on machine 2 and the electric and hydraulic devices of machine 2. For example, if hydraulic power is not needed for supplementing battery 33 or the electric subsystem, supervisory control 64 may provide control signals 70 to hydraulic subsystem control 62c, such that pump/motors 48a and 48b supply, for example, 50 units of power to pump/motor 52, and accumulator 54 supplies 10 units of power to pump/motor 52, thereby meeting the requested 60 units to move machine 2.

However, if supervisory control 64 determines that the electric subsystem would benefit from power supplied by the hydraulic subsystem, for example, if the electric subsystem was unable by itself to supply enough electric power to meet the requested operation demands of the electric subsystem, supervisory control 64 may determine that the hydraulic subsystem may supply power to supplement operation of battery 33 by, for example, 20 units of power. Thus, in order to meet the 20-unit power demand for supplementing battery 33 and the 60-unit power demand of the request to move machine 2, 80 units of power may be supplied from the combined 80 units of available power from pump/motors 48a and 48b and accumulator 54, so that 60 units are supplied to move machine 2, and 20 units are supplied to electric subsystem via power supplied to battery 33.

A machine according to various exemplary embodiments of this disclosure may be adapted for operation powered by any one of a plurality of interchangeable power sources. In the exemplary embodiment of an excavator 2, such as shown in FIG. 1, the machine may include an undercarriage configured for supporting ground engagement members 4 that propel the machine. An upper structure 6 may be rotatably supported on the undercarriage. The upper structure may include a swing frame 22, and swing frame 22 may be configured for supporting an operator cab 24, any one of the plurality of interchangeable power sources, hydraulic components, and electrical components. As shown in FIGS. 1 and 4-9, counterweight 126, 226 may be disposed at a first end of swing frame 22. In exemplary embodiments according to this disclosure, counterweight 226 may include a hollowed out portion 222 facing toward swing frame 22. As shown by a circled portion in the enlarged view of FIG. 8, a center core portion 310 of swing frame 22 may be centrally aligned with hollowed out portion 222 of counterweight 226. Center core portion 310 may be configured for supporting any one of the plurality of interchangeable power sources. In some exemplary embodiments, such as when a fuel cell is utilized, center core portion 310 may be configured to support hydrogen fuel tanks storing hydrogen for use as fuel by the fuel cell. Reference to "power sources" throughout this application and claims encompasses these hydrogen fuel tanks as well as other alternative power sources such as a battery, or an internal combustion engine. As shown in the exemplary embodiments of FIGS. 4 and 5, a battery pack 240 of an exemplary machine 200 may be the interchangeable power source mounted on swing frame 22, with a portion of battery pack 240 accommodated partially within hollowed out portion 222 of counterweight 226 and with the remaining portion of battery pack 240 being contained within a power source containing chamber 228 on swing frame 22.

As shown in FIGS. 4-8, power source containing chamber 228 may be disposed at a portion of swing frame 22 to the rear and lateral side of an operator cab 224. A power system ECM 262 and main machine ECM 266 may be positioned on swing frame 22 to one lateral side of operator cab 224 along with an inverter, one or more electric motors/generators, electric storage device(s), and one or more hydraulic pumps or other hydraulic components. The various electrical and hydraulic components may be disposed on ladder side skirts 312, 314 towards outer peripheries of the ladder side skirts in order to maximize the available room for center core portion 310 and the interchangeable power sources that may be provided on the swing frame. Center core portion 310 may also be lowered relative to the ladder side skirts in order to lower the center of gravity of the power source mounted on the center core portion. In some exemplary embodiments, one or more of the hydraulic pumps provided on the ladder side skirts may be mounted to the electric motors/generators and disposed longitudinally along outer peripheral portions of one or both of the ladder side skirts in order to maximize the amount of open space on center core portion 310 for mounting of an interchangeable power source.

Figure 6:
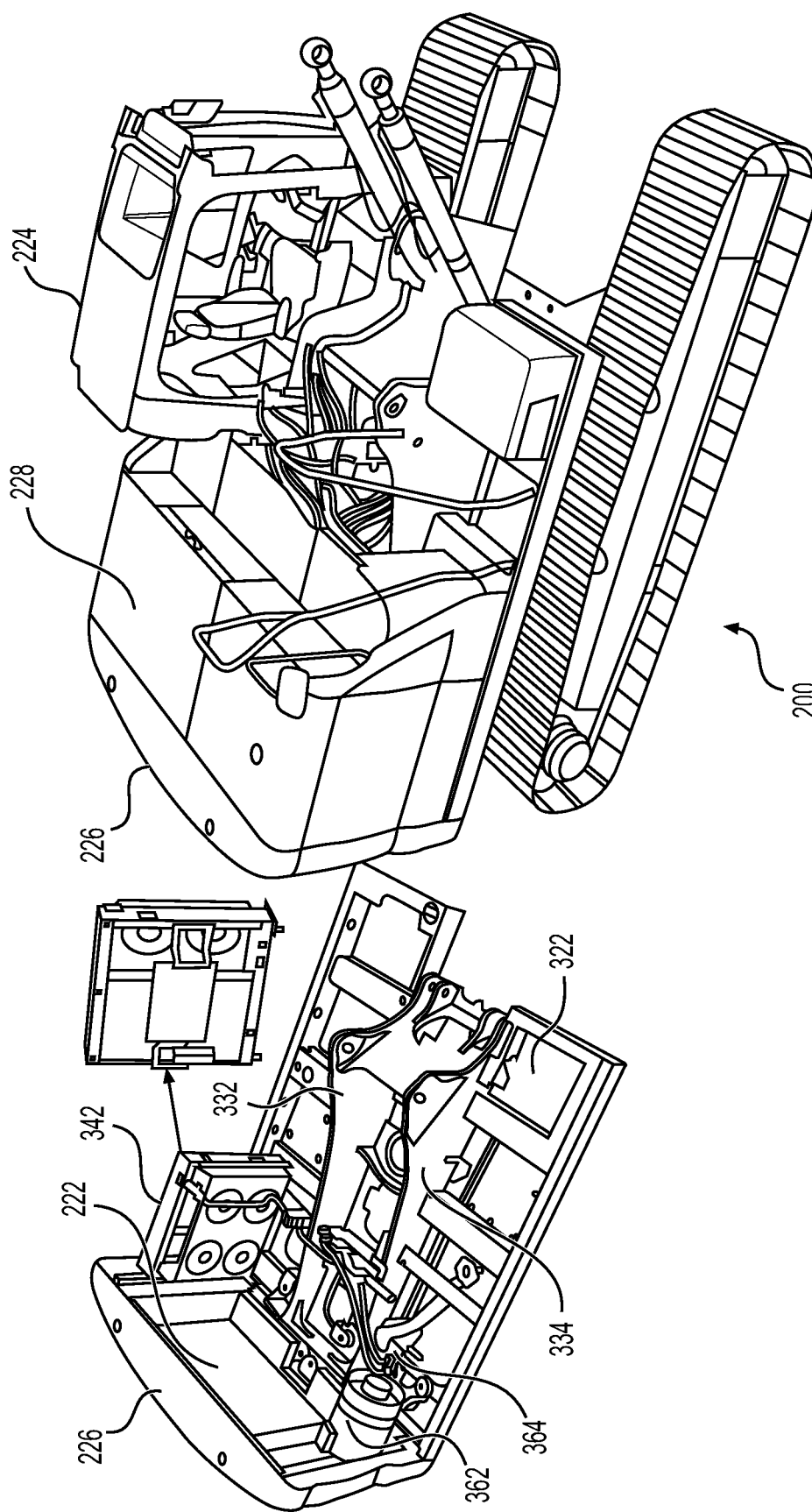
Figure 7:
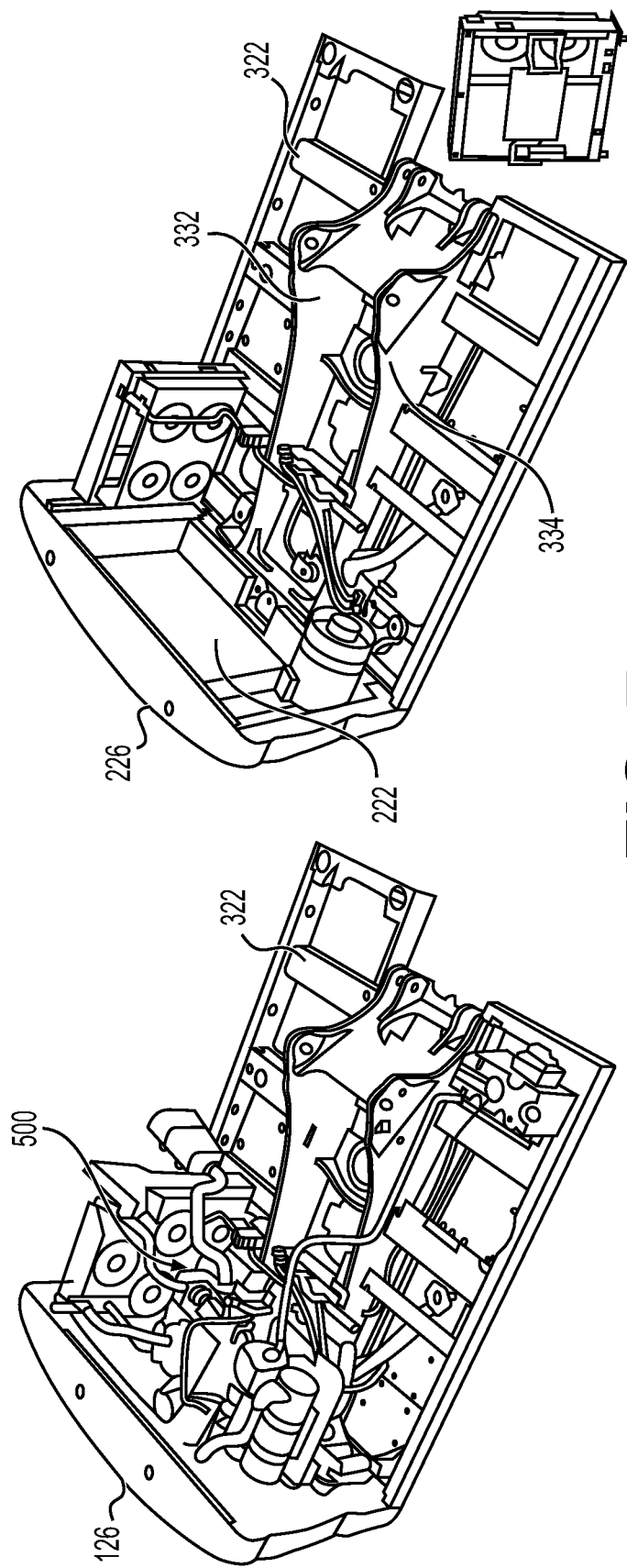
FIG. 7 is a schematic diagram illustrating an exemplary swing frame and counterweight of a machine before and after removal of an internal combustion power source and modifications enabling installation of interchangeable power sources.
Figure 8:
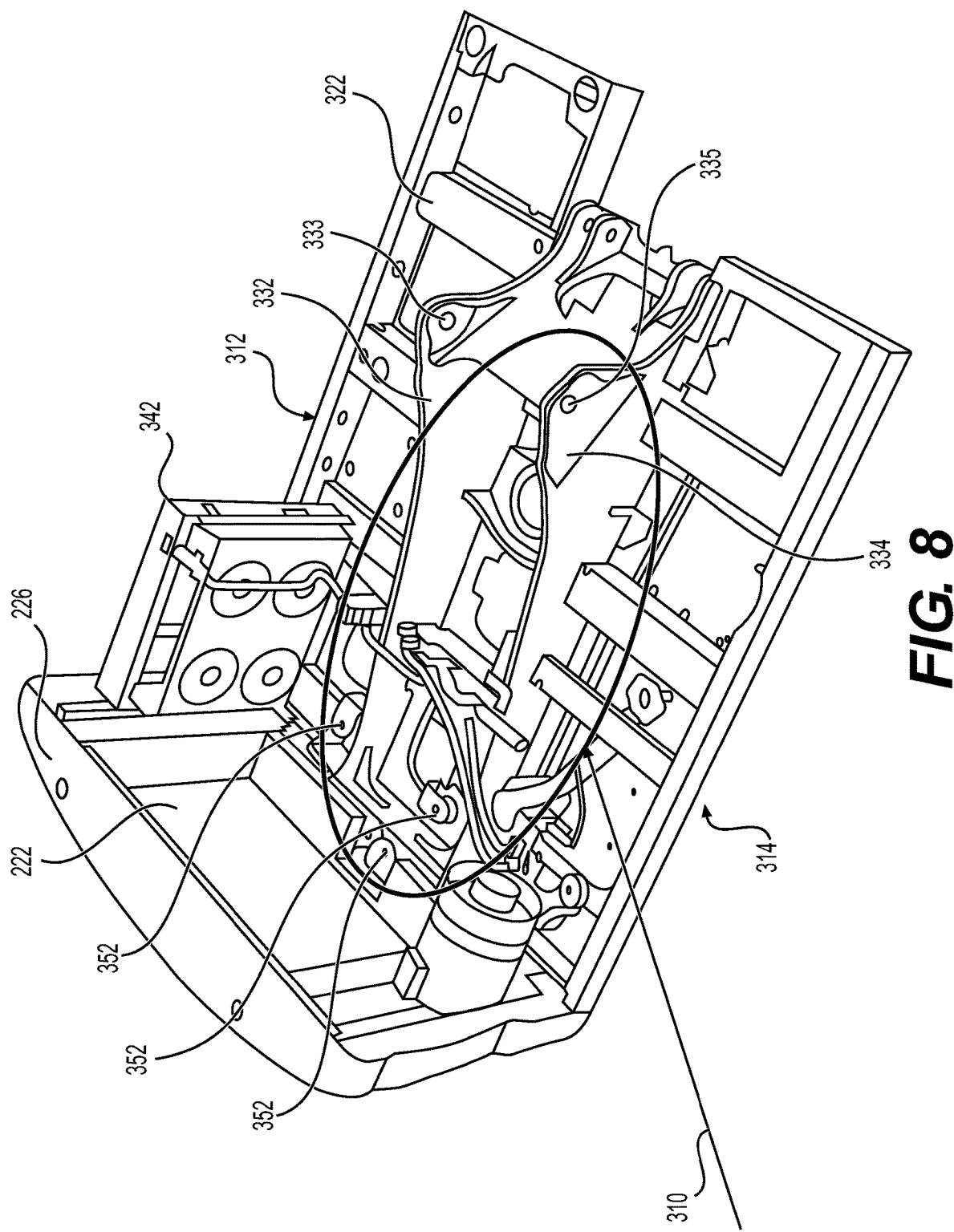
FIG. 8 is an enlarged schematic diagram of the exemplary swing frame of FIG. 7 modified to enable installation of interchangeable power sources.

Whichever one of the interchangeable power sources is mounted and employed on machine 2, the power source may be at least partially accommodated within hollowed out portion 222 of counterweight 226. As indicated above, in the case of a fuel cell, tanks configured for storing hydrogen as fuel for a fuel cell may be mounted at the rear of center core portion 310 and partially accommodated within hollowed out portion 222 of counterweight 226. This configuration enables and facilitates the installation of an interchangeable power source such as one of battery 33, an internal combustion engine, a fuel cell (or fuel tanks containing fuel used by a fuel cell), or a tethered cable system on swing frame 22 in a position that minimizes the overall size and weight of the machine, thus improving fuel economy. As best seen in FIGS. 6-8, swing frame 22 may be configured with center core portion 310 flanked on opposite lateral sides by ladder side skirts 312, 314. Each of ladder side skirts 312, 314 may include multiple, parallel, cross members 322. Center core portion 310 may include parallel, longitudinally arranged vertical reinforcing ribs 332, 334 with mounting bosses 333, 335, respectively, on opposite, lateral sides of center core portion 310. The left-hand illustration in FIG. 7 shows an internal combustion engine 500 mounted on a swing frame, along with associated cooling system components, exhaust treatment components, etc. The right-hand illustration in FIG. 7 shows a modified swing frame according to an exemplary embodiment of this disclosure, with the internal combustion engine and associated components removed, a hollowed out counterweight 226 disposed at a rear end of the swing frame, and the modified swing frame being configured for mounting of an interchangeable power source such as a battery pack. As best seen in the enlarged illustration of FIG. 8, a plurality of vibration-isolating mounting pads 352 may be disposed on center core portion 310 of the swing frame adjacent hollowed out portion 222 of counterweight 226. Vibration-isolating mounting pads 352 may be configured for mounting an interchangeable power source such battery pack 240 of FIG. 4 and isolating battery pack 240 from the accelerations and forces that may be generated during operation of the machine.

Swing frame 22 may include a ladder side skirt 312, 314 on each of opposite, lateral sides of center core portion 310, and center core portion 310 of swing frame 22 may extend below each of the ladder side skirts to lower the center of gravity for the one power source mounted on center core portion 310 of swing frame 22. The plurality of vibration-isolating mounting pads 352 may be disposed on center core portion 310 of swing frame 22 adjacent hollowed out portion 222 of counterweight 226. In various exemplary embodiments of this disclosure, hollowed out portion 222 of counterweight 226 may extend to both sides of center core portion 310 of swing frame 22. Swing frame 22 may be configured for supporting any one of the plurality of interchangeable power sources, and the ladder side skirts may be configured for supporting the hydraulic components and the electrical components on portions of the ladder side skirts spaced away from the center core portion to increase the amount of room available for mounting any one of the plurality of interchangeable power sources on center core portion 310. As discussed above, and shown, for example, in FIG. 8, center core portion 310 may include parallel, longitudinally arranged vertical reinforcing ribs 332, 334 on opposite, lateral sides of center core portion 310, and vibration-isolating mounting pads 352 configured for mounting the one power source and isolating the power source from vibrations that may occur during operation of the machine.

As shown, for example, in FIGS. 6 and 8, electrical components mounted on the outer peripheral portions of the ladder side skirts 312, 314 on lateral sides of center core portion 310 (see FIG. 8) may include a cooling system 342 including a plurality of fans, an electric motor driven by the power source, and the hydraulic components may include a pump 362 mounted to the electric motor with a coupling interposed between the pump and the electric motor and hydraulic lines 364. The coupling may enable mounting of the hydraulic pump directly to the electric motor, thus enabling a compact arrangement of the various electrical and hydraulic components on the ladder side skirts and maximizing the available space on center core portion 310 for mounting of any one of the interchangeable power sources.

The exemplary systems and methods described above include a combination of electric and hydraulic devices and a combination of electric and hydraulic storage devices. It is contemplated that the systems and methods described herein may not include both electric and hydraulic devices, or may not include both electric and hydraulic storage devices. For example, the systems and methods may be used in machines having electric devices and electric storage devices, or a combination of electric devices, electric storage devices, and non-hydraulic devices (e.g., non-hydraulic storage devices, such as, for example, a non-hydraulic, mechanical storage device such as a flywheel). Alternatively, the systems and methods may be used in machines having hydraulic devices and hydraulic storage devices, or a combination of hydraulic devices, hydraulic storage devices, and non-electric devices (e.g., non-electric storage devices, such as, for example, a non-electric, mechanical storage device such as a flywheel).

INDUSTRIAL APPLICABILITY

An exemplary machine and machine control system according to various embodiments of this disclosure may be used for performing work. In particular, an exemplary machine 2 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

As discussed above, exemplary power system 15 for a machine may be used to control power in the machine having both electric and hydraulic devices that may act as either power suppliers or consumers. In particular, exemplary power system 15 may control the power supply and consumption of the electric and hydraulic devices in a manner that improves the efficiency of a machine, while maintaining desirable control characteristics of the machine. The electric and hydraulic devices may include electric and hydraulic storage devices as well as electric and hydraulic actuators, such as, for example, electric motors, electric generators, electric motor/generators, hydraulic pumps, hydraulic motors, hydraulic pump/motors, and hydraulic cylinders.

Exemplary power system 15 may be configured for controlling operation of any one of a plurality of interchangeable power sources mounted on a machine, such as excavator 2 of FIG. 1. As discussed above, exemplary excavator 2 may include an undercarriage configured for supporting ground engagement members 4 that propel the excavator. An upper structure 6 may be rotatably supported on the undercarriage. Upper structure 6 may include a swing frame 22, and swing frame 22 may be configured for supporting an operator cab 24, any one of a plurality of interchangeable power sources, hydraulic components, electrical components, and one or more electronic control modules (ECM's) configured for controlling all of the various components. Power system 15 may include a controller 58. The machine control system enabled and embodied by controller 58 may include one or more processors configured to receive variables, control parameters, and standards associated with operation of each of the plurality of interchangeable power sources from one or more of sensors, input devices, output devices, and memory communicatively coupled to the one or more processors. The one or more processors may utilize control logic, machine operational inputs and outputs, sensed and processed signals associated with position, movement, and operation of the machine, and one or more of stored, sensed, and processed data, variables, control parameters, and standards to sense and process outputs and operating characteristics specific to each of the plurality of power sources. The one or more processors may also standardize the power output by each of the plurality of power sources to provide a normalized, consistent control and operation of systems of the machine regardless of which of the plurality of power sources is mounted on the machine.

In various exemplary implementations of this disclosure, the one or more processors of the machine control system enabled and embodied by controller 58 of power system 15 may be included in a power system electronic control module (ECM). The power system ECM may be configured to interface with at least one of a main machine ECM, an electrical system ECM, and a hydraulic system ECM. The electrical system ECM may be configured to control the operation of one or more of electrical components including at least one of an electric motor, an inverter, an insulated-gate bipolar transistor (IGBT), and a capacitor. The hydraulic system ECM may be configured to control the operation of one or more of hydraulic components including at least one of a pump, a motor, and a valve.

The power system ECM according to various exemplary embodiments of this disclosure may be configured to sense and determine which of a plurality of potential interchangeable power sources is currently mounted and operating on the machine. As discussed above, the plurality of interchangeable power sources may include an internal combustion engine, a battery, a fuel cell, and a tethered cable system configured to receive electrical power from a source external to the machine. The one or more of stored, sensed, and processed data, variables, control parameters, and standards associated with operation of each of the plurality of interchangeable power sources may be retrieved by the one or more processors from one or more lookup tables or maps stored in memory associated with the processors. The one or more processors may also be configured to determine a control strategy for controlling the systems of the machine based on the standardized power output from the particular interchangeable power source currently mounted and operating on the machine. By making the machine and associated software and hardware reconfigurable depending on which of a plurality of interchangeable power sources is mounted on the machine, machine production logistics for a machine according to the various embodiments of this disclosure may enable the shipment of a machine with an agnostic power source to a customer. The customer may then locally source a particular power source configured to meet the particular operational requirements for the customer. The ability to reconfigure the machine for operation by different, interchangeable power sources may also enable reconfiguration of the machine late in the process of machine configuration and production, thus offering more flexibility in crafting a cost effective solution to each customer's needs and particular requirements.

A machine according to various exemplary embodiments of this disclosure may also include a variable machine display adapted for operation powered by any one of a plurality of interchangeable power sources. The machine may include a power system electronic control module configured to receive variables, control parameters, and standards associated with operation of each of the plurality of interchangeable power sources from one or more of sensors, input devices, output devices, and memory communicatively coupled to the power system electronic control module. The power system electronic control module may utilize control logic, machine operational inputs and outputs, sensed and processed signals associated with position, movement, and operation of the machine, and one or more of stored, sensed, and processed data, variables, control parameters, and standards to sense and process outputs and operating characteristics specific to each of the plurality of power sources. The power system electronic control module may standardize the power output by each of the plurality of power sources to provide a normalized, consistent control and operation of systems of the machine regardless of which of the plurality of interchangeable power sources is mounted on the machine.

The variable machine display for the machine may include an associated display controller communicatively coupled with the power system electronic control module. The display controller may be configured to receive one or more signals indicative of the standardized power output produced by the power system electronic control module, and display one or more of information, icons, and overall appearance that are modified based on the one of the plurality of interchangeable power sources that is mounted on and powering the machine. In one exemplary embodiment, a display controller may display remaining battery power or other battery-related parameters when the one of the plurality of interchangeable power sources is a battery. In an alternative exemplary embodiment, a display controller may display an amount of remaining fuel or other power source operating characteristics when the one of the plurality of interchangeable power sources is one of an internal combustion engine or a fuel cell. In a still further exemplary embodiment, a display controller may display real time electrical power being received by the machine from an external electrical power source when the one of the plurality of interchangeable power sources is a tethered cable system configured to connect the machine to the external electrical power source.

It will be apparent to those skilled in the art that various modifications and variations can be made to the exemplary disclosed systems, methods, and machines. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A machine adapted for operation powered by any one of a plurality of interchangeable power sources, the machine comprising:
    an undercarriage configured for supporting ground engagement members that propel the machine;
    an upper structure rotatably supported on the undercarriage, the upper structure comprising a swing frame, the swing frame being configured for supporting an operator cab, any one of the plurality of interchangeable power sources, hydraulic components, and electrical components, wherein the swing frame includes a ladder side skirt on each of opposite, lateral sides of a center core portion of the swing frame, and the center core portion extends below a bottom of each of the ladder side skirts to lower a center of gravity of the one power source mounted on the center core portion; and
    a counterweight disposed at a first end of the swing frame, the counterweight including a hollowed out portion facing toward the swing frame, the hollowed out portion being centrally aligned with the center core portion, with the one power source being partially accommodated within the hollowed out portion of the counterweight.

2. The machine according to claim 1, wherein the center core portion includes parallel, longitudinally arranged vertical ribs on opposite, lateral sides of the center core portion, and a plurality of vibration-isolating mounting pads configured for mounting the one power source.

3. The machine according to claim 1, wherein a plurality of vibration-isolating mounting pads are disposed on the center core portion of the swing frame adjacent the hollowed out portion of the counterweight.

4. The machine according to claim 1, wherein the hollowed out portion of the counterweight extends to both sides of the center core portion of the swing frame.

5. The machine according to claim 1, wherein the ladder side skirts are configured for supporting the hydraulic components and the electrical components on portions of the ladder side skirts spaced away from the center core portion to increase the amount of room for mounting the one power source on the center core portion.

6. The machine according to claim 5, wherein the center core portion includes parallel, longitudinally arranged vertical ribs on opposite, lateral sides of the center core portion, and a plurality of vibration-isolating mounting pads configured for mounting the one power source.

7. The machine according to claim 6, wherein the electrical components include an electric motor driven by the one power source and the hydraulic components include a pump mounted to the electric motor with a coupling interposed between the pump and the electric motor, and with the pump and electric motor being installed longitudinally on one of the ladder side skirts on an opposite side of the center core portion from the operator cab installed on the other ladder side skirt.

8. A machine adapted for operation powered by a battery, the machine comprising:
- an undercarriage configured for supporting ground engagement members that propel the machine;
- an upper structure rotatably supported on the undercarriage, the upper structure comprising a swing frame, the swing frame being configured for supporting an operator cab, the battery, hydraulic components, and electrical components, wherein the swing frame includes a ladder side skirt on each of opposite, lateral sides of a center core portion of the swing frame, and the center core portion extends below a bottom of each of the ladder side skirts to lower a center of gravity of the one power source mounted on the center core portion; and
- a counterweight disposed at a first end of the swing frame, the counterweight including a hollowed out portion facing toward the swing frame, the hollowed out portion being centrally aligned with the center core portion, with the battery being partially accommodated within the hollowed out portion of the counterweight.

9. The machine according to claim 8, wherein the center core portion includes parallel, longitudinally arranged vertical ribs on opposite, lateral sides of the center core portion, and a plurality of vibration-isolating mounting pads configured for mounting the battery and isolating the battery from vibrations generated during operation of the machine.

10. The machine according to claim 8, wherein a plurality of vibration-isolating pads are disposed on the center core portion of the swing frame adjacent the hollowed out portion of the counterweight.

11. The machine according to claim 8, wherein the hollowed out portion of the counterweight extends to both sides of the center core portion of the swing frame.

12. The machine according to claim 8, wherein the ladder side skirts are configured for supporting the hydraulic components and the electrical components on portions of the ladder side skirts spaced away from the center core portion to increase the amount of room for mounting the battery on the center core portion.

13. The machine according to claim 12, wherein the center core portion includes parallel, longitudinally arranged vertical ribs on opposite, lateral sides of the center core portion, and a plurality of vibration-isolating mounting pads configured for mounting the battery.

14. The machine according to claim 13, wherein the electrical components include an electric motor driven by electrical power from the battery and the hydraulic components include a pump mounted to the electric motor with a coupling interposed between the pump and the electric motor, and with the pump and electric motor being installed longitudinally on one of the ladder side skirts on an opposite side of the center core portion from the operator cab installed on the other ladder side skirt.

15. A machine adapted for normal operations powered by one of a plurality of interchangeable, full size power sources, and select, temporary operations during one or more of manufacturing of the machine, loading of the machine, shipping of the machine, or delivery of the machine, wherein the select operations are powered by a temporary battery with a smaller power capacity than the one of the plurality of full size power sources, the machine comprising:
- an undercarriage configured for supporting ground engagement members that propel the machine;
- an upper structure rotatably supported on the undercarriage, the upper structure comprising a swing frame, the swing frame being configured for supporting an operator cab, the one of a plurality of full size power sources and the temporary battery, hydraulic components, and electrical components, wherein the swing frame includes a ladder side skirt on each of opposite, lateral sides of a center core portion of the swing frame, and the center core portion extends below a bottom of each of the ladder side skirts to lower a center of gravity of the one power source mounted on the center core portion; and
- a counterweight disposed at a first end of the swing frame, the counterweight including a hollowed out portion facing toward the swing frame, the hollowed out portion being centrally aligned with the center core portion of the swing frame configured for supporting the temporary battery during the select, temporary operations and the one of a plurality of full size power sources during normal operations, with the one of a plurality of full size power sources and the temporary battery being partially accommodated within the hollowed out portion of the counterweight.

16. The machine according to claim 15, wherein the ladder side skirts are configured for supporting the hydraulic components and the electrical components on portions of the ladder side skirts spaced away from the center core portion to increase the amount of room for mounting the one of a plurality of full size power sources on the center core portion.

* * * * *